United States Patent [19]

Takemori et al.

[11] 4,415,595

[45] Nov. 15, 1983

[54] MARSHMALLOW FROZEN CONFECTION

[75] Inventors: Toshio Takemori, Tokyo; Masateru Kato, Urawa; Fumio Masuda, Showa, all of Japan

[73] Assignee: Lotte Co., Ltd., Tokyo, Japan

[21] Appl. No.: 324,406

[22] Filed: Nov. 24, 1981

[30] Foreign Application Priority Data

Nov. 29, 1980 [JP] Japan ................. 55-167385

[51] Int. Cl.³ .......................... A23G 3/00; A23G 9/00
[52] U.S. Cl. .................... 426/101; 426/103; 426/104; 426/565; 426/571; 426/305
[58] Field of Search ............... 426/100, 101, 103, 104, 426/565, 566, 567, 571, 305

[56] References Cited

U.S. PATENT DOCUMENTS

| | | | |
|---|---|---|---|
| 2,801,922 | 8/1957 | Oprean | 426/101 |
| 3,620,769 | 11/1971 | Peterson | 426/103 |
| 4,039,688 | 8/1977 | Hayward et al. | 426/103 |
| 4,104,405 | 8/1978 | Forkner | 426/103 |
| 4,152,463 | 5/1979 | Hayward et al. | 426/571 |
| 4,189,502 | 2/1980 | Rubenstein | 426/565 |

Primary Examiner—Jeanette M. Hunter
Attorney, Agent, or Firm—Murray Schaffer

[57] ABSTRACT

A marshmallow frozen confection in which the marshmallow encloses a core material, such as ice cream or sherbert and which retains its solidity at the temperature below about −15° C. A water content of the marshmallow is in the range of about 20 to 35%.

1 Claim, No Drawings

MARSHMALLOW FROZEN CONFECTION

FIELD OF THE INVENTION

This invention relates to a marshmallow frozen confection.

BACKGROUND OF THE INVENTION

The marshmallow has been widely utilized as a foodstuff having ample elasticity and has been commercialized as such or as a confection enclosing a jam or bean-jam as a core material.

It has been contemplated that a frozen confection, such as ice cream or sherbet, be incorporated as the core material into the marshmallow to provide a unique confection. On the other hand, the frozen confection must be stored usually below about $-15°$ C. in order to retain its solidity. A marshmallow, which is prepared by the conventional process, has a water content of about 10 to 18% in order to maintain a long shelf stability such marshmallow hardens upon long storage at the deep temperature, such as below $-15°$ C., resulting in considerable decline in mouth feel.

SUMMARY OF THE INVENTION

According to the present invention it has been found that an increase in water content will provide a marshmallow frozen confection which retains its elasticity upon freezing, is capable of enclosing a core material such as a foodstuff and is capable of retaining its solidity at the temperature below about $-15°$ C.

Accordingly, an object of the invention is to provide a marshmallow frozen confection, which comprises the marshmallow enclosing therein a core material capable of retaining its solidity at the temperature below about $-15°$ C.

PREFERRED EMBODIMENT OF THE INVENTION

In accordance with the invention, the water content of the marshmallow is selected from the range of about 20 to 35%.

The core material may be selected from so-called frozen confections, such as ice cream, sherbet and the like.

The invention will be described hereinbelow with a typical example.

The marshmallow according to the invention was prepared using the following formulation:

| Materials | Amounts (g) |
| --- | --- |
| Water | 1,250 |
| Gelatine | 300 |
| Water | 1,250 |
| Sugar | 3,500 |
| Starch Hydrolysate | 1,500 |
| Inverted Sugar | 1,500 |

In accordance with the above formulation, 300 g of gelatin was dissolved in 1,250 g of hot water with stirring, while a syrup was prepared by boiling down 3,500 g of sugar, 1,500 g of starch hydrolysate, 1,500 g of inverted sugar and 1,250 g of water. The former solution was then added to the syrup and beaten with a beater under violent agitation, and thereafter the mixture was poured into starch for shaping. The mass was kept at the room temperature and then freed from the starch by sieving to provide the marshmallow having a water content of about 27%.

An ice cream was enveloped by the marshmallow thus obtained by means of a conventional enveloping machine for bean-jam, and was then shaped. The shaped product was frozen rapidly to provide a final product.

The marshmallow frozen confection thus obtained according to the invention was compared with a commercial marshmallow having a water content of about 15% by storing both of the samples under the temperature condition below $-15°$ C. for a given time. The taste feelings evaluated by a panel test are reported in the following table.

TABLE 1

Test for preference comparing the marshmallow frozen confection according to the invention (water content of about 27%) with the commercial marshmallow (water content of about 15%).

| Sample | panel member | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Marshmallow of the invention | O | O | O | O | O | O | O | O | O | O |
| Commercial marshallow | X | X | X | X | X | X | X | X | X | X |

As apparent from the above result, the marshmallow sample of the invention was preferred over the commercial one which has much hardened upon cold storing.

In accordance with the invention, a multi-cellular structure of the marshmallow enhances the heat retaining property of frozen food as the core material and improves its shape retention.

What is claimed is:

1. A food product comprising in combination a marshmallow exterior and a frozen confection interior said marshmallow having a multi-cellular structure retentive of shape, elasticity and softness when stored at a temperature below $-15°$ C. and consisting essentially of 20 to 25 wt.% water, at least 60 wt.% sugar and the remainder gelatine, said frozen confection being selected from the group consisting of ice cream and sherbert, and wherein said frozen confection is embedded in and covered completely by said marshmallow exterior.

* * * * *